July 21, 1925.                                                                  1,546,942
                              E. N. ROTH
                               GASKET
                         Filed April 23, 1924

Inventor.
Edward N. Roth
By Barnett Numan
Attorneys

Patented July 21, 1925.

1,546,942

UNITED STATES PATENT OFFICE.

EDWARD N. ROTH, OF CHICAGO, ILLINOIS, ASSIGNOR TO ROTH RUBBER COMPANY, OF CHICAGO, ILLINOIS, A CORPORATION OF ILLINOIS.

GASKET.

Application filed April 23, 1924. Serial No. 708,494.

*To all whom it may concern:*

Be it known that I, EDWARD N. ROTH, a citizen of the United States, residing at Chicago, in the county of Cook and State of Illinois, have invented certain new and useful Improvements in Gaskets, of which the following is a specification.

My invention relates to gaskets, and more particularly to steam hose coupler gaskets made of rubber compositions of one kind or another, so as to be expansible at steam temperature for sealing the joint between the articulated or abutted couplers with which the gaskets are used. It has been customary to provide gaskets of this type with metallic ferrules, rings or armorings, frequently made of brass, either on the inside of the gasket or on the outside, or on both inside and outside, for protecting the rubber composition body and affording means for engaging the gasket with the coupler so that it will not fall out of the coupler when the latter is disengaged from its mate. Ordinarily the life of a gasket of this type is not very long. The rubber composition becomes hard, cracks and disintegrates after a certain period of service; and this I discovered is due, in part at least, to the metal ferrule or armoring which, as the device heats up and cools, does not expand or contract uniformly with the rubber composition so that stresses and pressures of a destructive or injurious character are set up to the detriment, in particular, of the body of the gasket.

My invention overcomes this defect and adds to the effectiveness and durability of the gaskets by so constructing the ferrules or armorings that these metal elements can expand and contract, to some extent, independent of the rubber composition bodies whereby heating and cooling of the gaskets can take place without detrimental strains of the rubber composition of the bodies.

The invention is illustrated, in certain preferred embodiments, in the accompanying drawing wherein—

Figure 1:
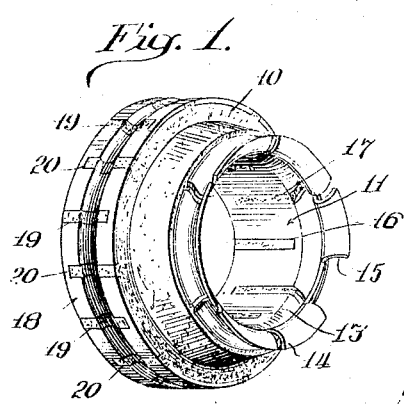
Fig. 1 is a view in perspective of a gasket of a known type but with the ferrules or armorings constructed in accordance with my invention.
Figure 3:
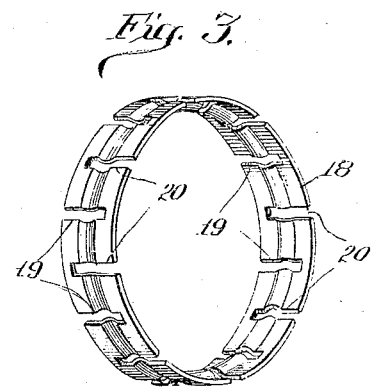
Fig. 3 is a view, in perspective, of the outer metal ring.
Figure 2:
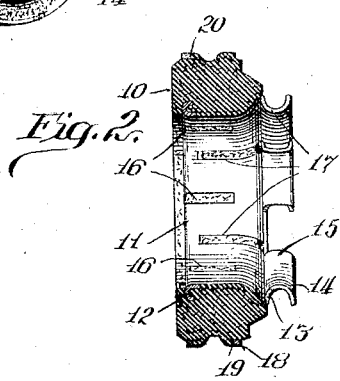
Fig. 2 is a diametrical sectional view of the gasket.
Figure 4:
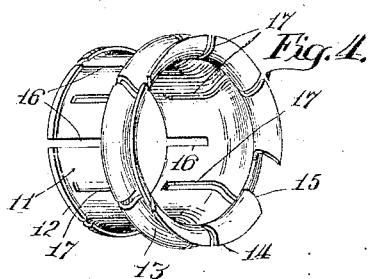
Fig. 4 is a similar view of the inner ring.

Referring first to Figs. 1 to 4 inclusive, 10 designates the annulus of rubber composition which forms the body of the gasket. The invention is not limited to any particular composition of the body 10, there being several of such composite substances on the market which are used for this purpose. They consist, generally speaking, of rubber mixed with other substances such as asbestos, for example, and molded and treated so as to make the product relatively hard. A gasket body made of compositions of this type will expand at the temperature of steam so as to bring about an effective seal of the joint with which the gasket is used. Steam train line hose couplings, such as are used in railway service, consist ordinarily of two interlocked hose couplers each of which is provided in a recess at the mouth of the coupler for a gasket which projects slightly beyond the outer edge of the coupler. These gaskets, expanding under the influence of steam passing through the train line, have their outer faces brought into intimate contact thereby sealing the joint between the couplers.

The gasket shown in Figs. 1 to 4 inclusive is provided with a brass ferrule 11, one edge of which is overturned, as indicated at 12, and molded into the body of the gasket. The other edge 13 of the ferrule projects from the gasket body and is in the form of a channel 14 cut away at 15. This channeled portion of the ferrule is engaged by a gasket holding device for removably holding the gasket in place in the coupler.

In accordance with my present invention the ferrule 11 is formed with a plurality of slots extending longitudinally with respect to the port of the gasket whereby the expansion and contraction of the ferrule is, to a considerable extent, and sufficiently to achieve the purpose in hand, independent of the contraction and expansion of the rubber composition body 10. Preferably there are two sets of slots 16 and 17 which are in staggered arrangement and extend in alternation to the opposite edges of the ferrule.

It is usual to provide a gasket of this particular type with a brass ring on its outer surface. This ring is indicated at 18 and in accordance with my invention is formed with two sets of slots 19 and 20 in staggered relation, the slots of one set extending to one edge of the ring and the slots of the other set to the other edge of the ring.

Figure 5:
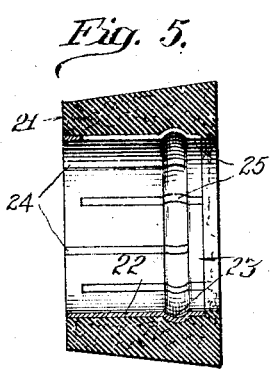
Figs. 5 and 6 are longitudinal sectional views on different diametrical lines of a different form of gasket.
Figure 6:
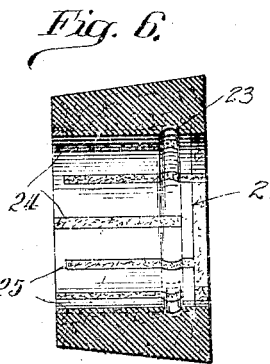

A different form of gasket is shown in Figs. 5 and 6, the body 21 consisting of a frusto-conical annulus of rubber composition with a metallic ring 22 molded into the inner surface thereof and formed with a circular indentation 23 for engagement by a suitable device for holding the gasket in place in the coupler. In accordance with my invention the ring 22 is formed with a plurality of expansion slots preferably arranged as in the gasket previously described, namely, in two series the slots 24 of one series extending to one edge of the ring and the slots 25 of the other series extending to the other edge.

Figure 7:
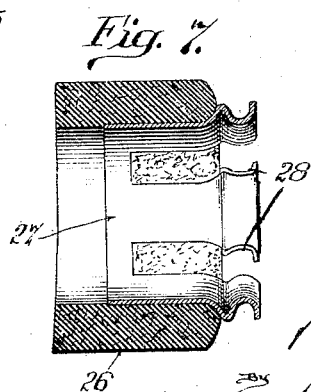
Fig. 7 is a longitudinal sectional view of another form of gasket.

In Fig. 7 I have shown a gasket consisting of a body portion 26 and an internal brass ferrule 27 formed with a plurality of relatively wide slots 28, preferably four in number, which extend to the outer edge of the ferrule and are preferably spaced apart equally distantly.

The improvement above described adds considerably to the efficiency and durability of the gaskets by reducing and minimizing the stresses set up in the rubber composition bodies through expansion and contraction of the gaskets. The gaskets are necessarily compressed one against the other. That is, when the steam is turned on there is a longitudinal expansion of the gaskets creating a pressure of one gasket against the other. This pressure, which has an injurious effect eventually upon the rubber composition, is unavoidable but its effects may be minimized by constructing the metal rings, ferrules or armorings as above described.

I claim:

1. A gasket comprising, in combination, a body portion of rubber composition and a sheet metal annular element permanently united with the rubber composition body and formed with transverse slots so that the metal element may expand and contract with the expansion and contraction of the body portion.

2. A gasket comprising, in combination, a body portion of rubber composition and a sheet metal annular element permanently united with the rubber composition body and formed with slots extending from one edge thereof, for the purpose described.

3. A gasket comprising, in combination, a body portion of rubber composition and a sheet metal annular element permanently united with the rubber composition body and formed with transverse slots, some of which extend to one edge of the ring and others to the other edge thereof.

4. A gasket comprising, in combination, a body portion of rubber composition and a sheet metal annular element permanently united with the rubber composition body but formed so that it can expand and contract independently thereof, and formed with two sets of slots in staggered relation, one set extending to one edge of the annular element and the other to the other edge thereof.

5. A gasket comprising, in combination, an annulus of rubber composition, a metal ring, permanently united with the interior surface, and a metal ring permanently united with the exterior surface of the annulus and formed with a plurality of slots which extend in alternation to opposite edges of the ring.

6. A gasket comprising, in combination, a body portion of rubber composition and a metal ring permanently united with the exterior surface of the annulus and formed with a plurality of slots extending longitudinally with respect to the port of the gasket.

7. A gasket comprising, in combination, a body portion of rubber composition and a metal ring united with the exterior surface of the annulus and formed with a plurality of transverse slots which extend to one edge of the ring.

8. A gasket comprising, in combination, a body portion of rubber composition and a metal ring united with the interior surface of the annulus and formed with a plurality of slots which extend in alternation to opposite edges of the ring.

EDWARD N. ROTH.